United States Patent [19]

Sherman

[11] Patent Number: 4,946,429

[45] Date of Patent: Aug. 7, 1990

[54] POWER TRANSMISSION WITH A CONTINUOUSLY VARIABLE SPEED RANGE

[75] Inventor: James F. Sherman, Brighton, Mich.

[73] Assignee: General Motors Corporation, Detroit, Mich.

[21] Appl. No.: 393,502

[22] Filed: Aug. 14, 1989

[51] Int. Cl.$^5$ ............................................. F16H 37/00
[52] U.S. Cl. .................................................... 475/210
[58] Field of Search ................. 475/207, 210, 213, 72, 475/214

[56] References Cited

U.S. PATENT DOCUMENTS 4,290,320  9/1981  Abbott ................................. 475/210

Primary Examiner—Leslie A. Braun
Assistant Examiner—Harold F. Macris
Attorney, Agent, or Firm—Donald F. Scherer

[57] ABSTRACT

A power transmission has a torque converter, a planetary gear arrangement and a variable ratio drive belt. The planetary gear arrangement is controlled to establish a low forward ratio and a reverse ratio. The variable ratio belt drive is controlled to provide a variable ratio high speed range. A torque converter is utilized during the low forward ratio and the reverse ratio and is selectively bypassed during the high speed range.

1 Claim, 3 Drawing Sheets

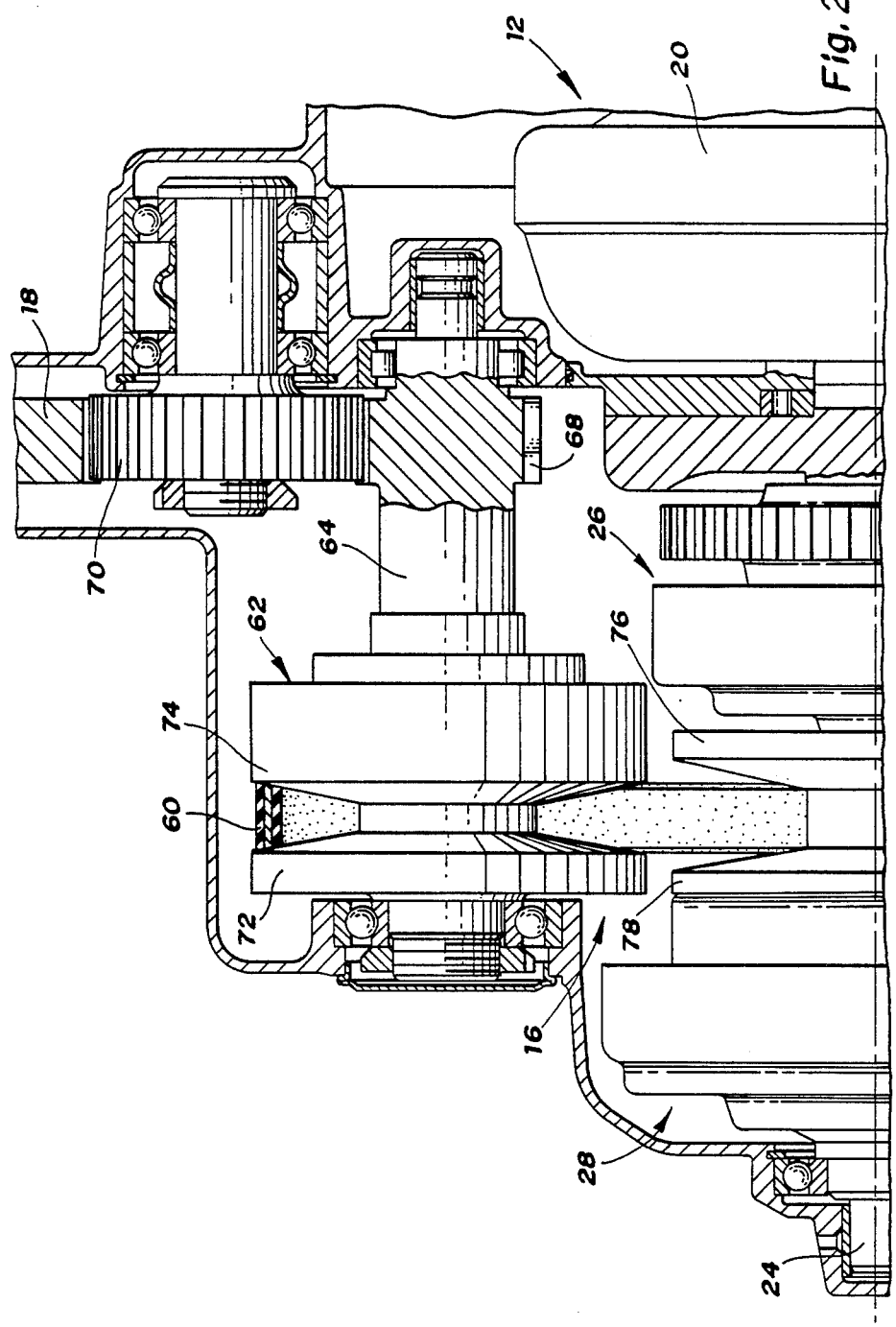

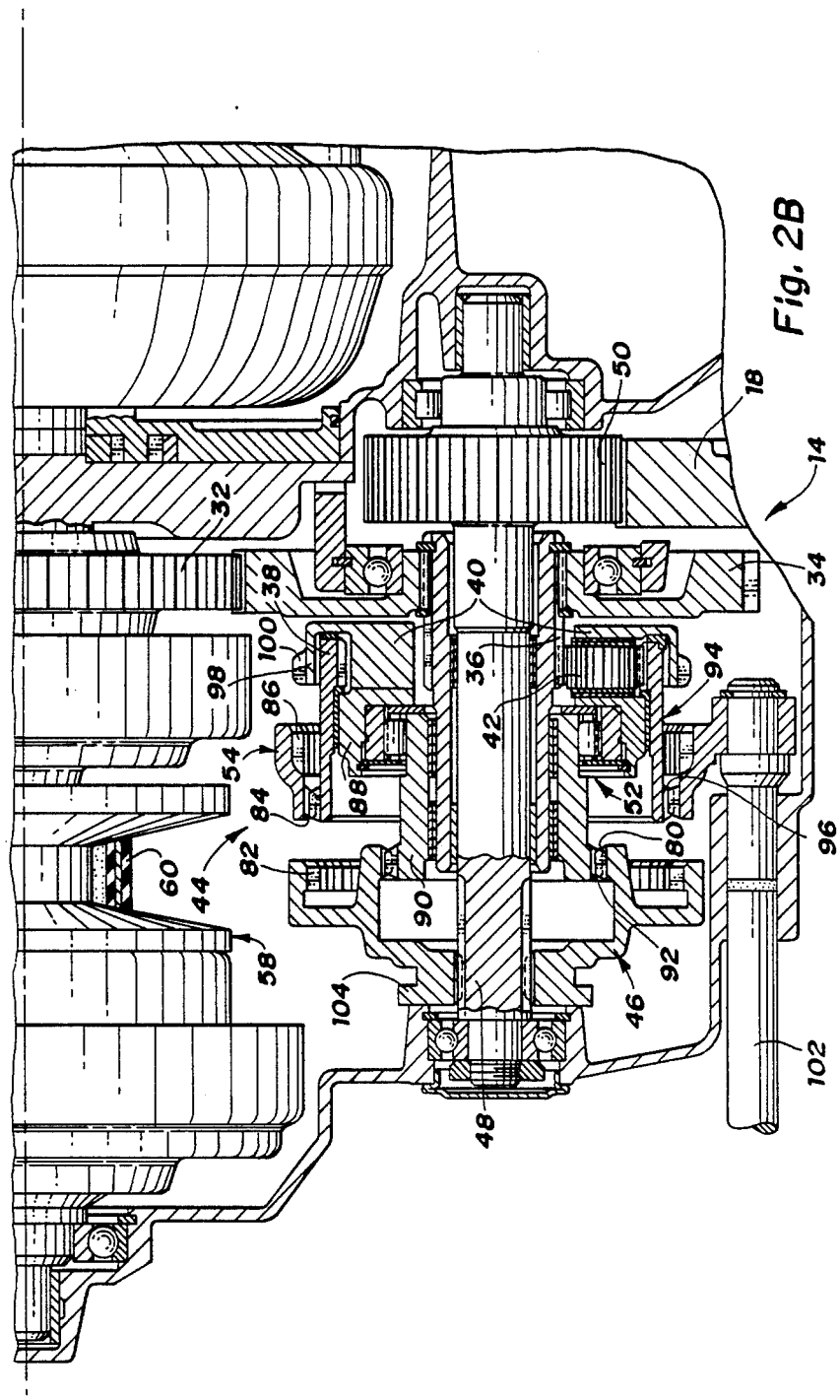

POWER TRANSMISSION WITH A CONTINUOUSLY VARIABLE SPEED RANGE

BACKGROUND OF THE INVENTION

This invention relates to power transmissions having a plurality of speed ratios, and more particularly, to a power transmission having a variable ratio belt drive for providing a variable speed ratio range in a multi-ratio transmission.

A conventional variable ratio power transmission has a variable belt drive mechanism disposed in series with the transmission input; i.e., torque converter and planetary gear arrangement, which provides forward and reverse drive ratios either into or out of the variable belt drive mechanism. With these arrangements, the variable belt drive mechanism transmits the high torque values required to launch the vehicle during operation in the low forward ratio and the reverse ratio. These torque values can be very high when a vehicle is fully loaded or started on an upgrade.

The prior art transmissions therefore, must size the variable belt mechanism to have sufficient torque capacity to continuously transmit these high torque loads. This generally becomes the limiting factor in the design of a transmission using a variable belt drive. In automotive passenger vehicles, this factor results in variable belt drive mechanisms being utilized only in small vehicles having a low GVW and a short wheel base.

SUMMARY OF THE INVENTION

The present invention provides a power transmission wherein a variable belt drive mechanism is used in the high speed range only. Thus, the high torque required for vehicle launch and grade negotiation is not transmitted through the variable belt drive. To accomplish this, the present invention provides a pair of input friction clutches which are selectively engageable to connect the transmission power input; i.e., torque converter and clutch assembly, to a planetary gear arrangement or the variable belt drive.

By providing a ratio step between the low ratio and the high ratio and by utilizing a torque converter clutch, the torque capacity of the variable belt drive mechanism is reduced significantly. This arrangement also requires less ratio coverage in the belt drive thereby reducing axial travel of the pulleys such that the overall axial space requirement of the transmission is reduced.

It is therefore an object of this invention to provide an improved power transmission having a planetary gear arrangement and a variable belt drive mechanism, wherein the planetary gear arrangement is selectively connected between the transmission input and output during a low forward drive ratio and a reverse drive ratio, and the variable belt ratio mechanism is selectively connected between the transmission input and output during a high forward drive ratio.

It is another object of this invention to provide an improved power transmission wherein a pair of selectively engageable input friction clutches are disposed and controlled to alternatively connect a planetary gear arrangement for low and reverse ratios or a variable ratio belt drive, for high forward ratio, to the input of the transmission, and further wherein, a selectively operable clutch and brake provide for alternatively establishing the low ratio or the reverse ratio in the planetary gear set.

It is a further object of this invention to provide an improved power transmission as defined in the preceding objects, wherein the low forward ratio is established to the exclusion of the variable belt drive and the high forward ratio is established to the exclusion of the planetary gear arrangement, and further wherein, a step ratio is provided between the low forward and high forward ratios having a value less than the value of the low forward ratio provided by the planetary gear set.

These and other objects and advantages of the present invention will be more apparent from the following specification and drawings.

DESCRIPTION OF THE DRAWINGS

FIGS. 2A and 2B, when viewed together, are a plan view of a transmission incorporating the present invention which has been unfolded about the input axis to provide a more clear representation of both the planetary gear arrangement and the variable belt drive mechanism.

DESCRIPTION OF AN EXEMPLARY EMBODIMENT

Figure 1:
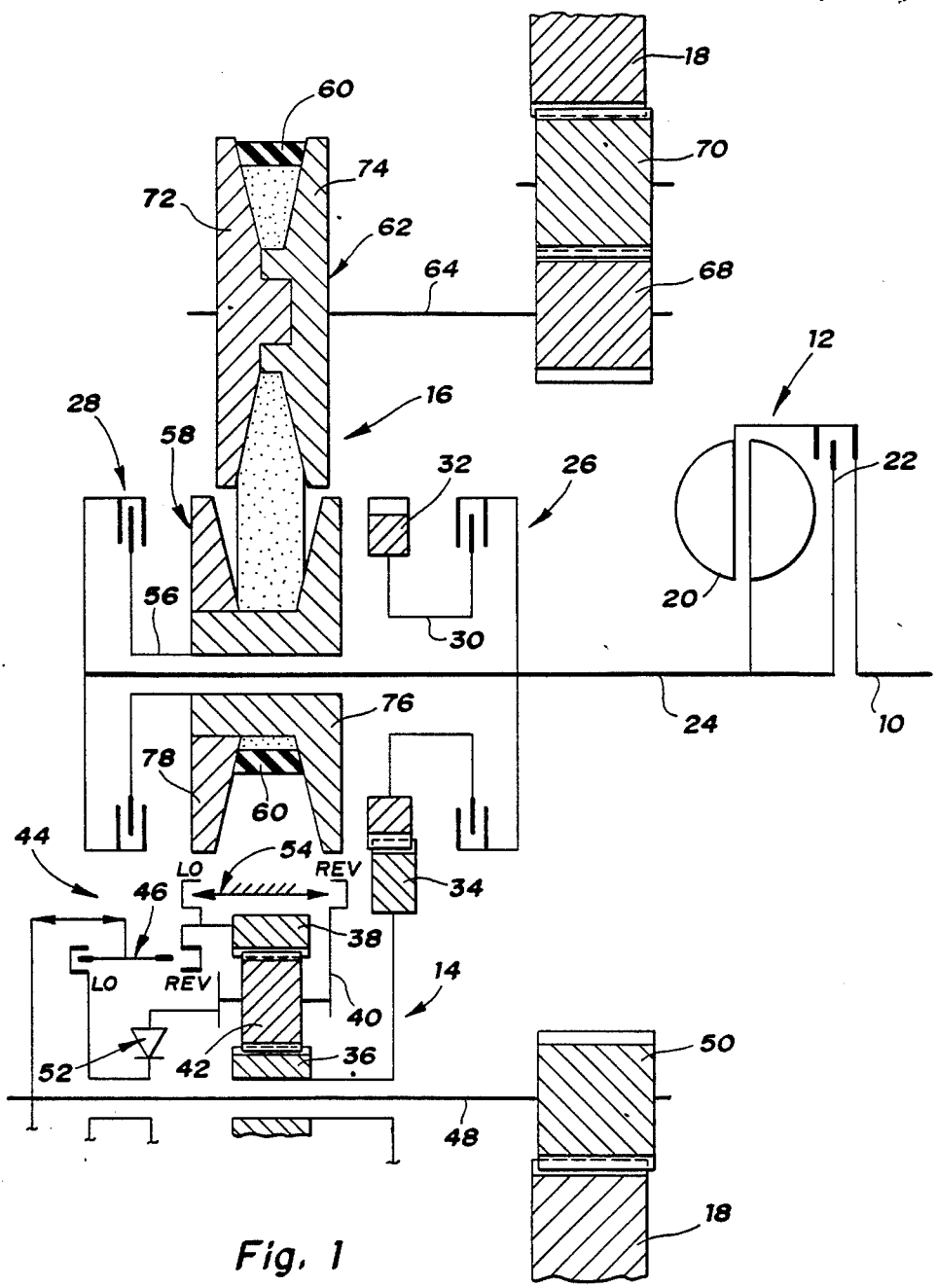
FIG. 1 is a schematic representation of a transmission incorporating the present invention.

Referring to the drawings, there is seen in FIG. 1 a power transmission having an input shaft 10, a torque converter and clutch assembly 12, a planetary gear arrangement 14, a variable ratio belt mechanism 16 and an output gear 18. The output gear 18 is drivingly connected to a conventional differential, not shown, which in turn is connected to the drive wheels of a vehicle, not shown. The torque converter and clutch assembly 12 includes a conventional torque converter 20 and a torque converter clutch 22. Both the torque converter 20 and the torque converter clutch 22 are connected with a transmission input shaft 24 to which is operatively connected a pair of input clutches 26 and 28. The clutches 26 and 28 are conventional fluid operated friction type clutches.

The clutch 26 has an output member 30 which is drivingly connected with an input transfer gear 32, which in turn meshes with another transfer gear 34. The transfer gear 34 is drivingly connected with a sun gear 36 which is a member of the planetary gear arrangement 14.

The planetary gear arrangement 14 includes the sun gear 36, a ring gear 38, a planet carrier 40 and a plurality of planet pinions 42 which are rotatably mounted on the carrier 40 and disposed in meshing relation with the sun gear 36 and ring gear 38. A clutch and brake arrangement, generally designated 44, is provided to control the ratio established within the planetary gear arrangement 14. The arrangement 44 has a clutch portion 46 adapted to alternatively connect the ring gear 38 and the carrier 40 to a planetary output shaft 48, which in turn is connected through a planetary output gear 50 to the transmission output gear 18.

A conventional overrunning clutch 52 is disposed in serial drive relation between the carrier 40 and the clutch 46. The arrangement 44 also has a brake portion 54 which is selectively connectible with ground to restrain the carrier 40 and the ring gear 38 from rotation, alternatively.

The planetary gear arrangement 14 is conditioned for a forward drive when the clutch 46 is moved to the LO position and the brake 54 is moved to the LO position. With the LO position selected, the carrier 40 becomes the output member of the planetary arrangement 14, and the ring gear 38 becomes the reaction member. To establish a reverse ratio in the planetary arrangement 14, the clutch 46 is moved to the REV position and the brake 54 is moved to the REV position. When the arrangement 44 is thus conditioned, the carrier 40 is established as a reaction member within the planetary arrangement 14 and the ring gear 38 is established as an output member for the planetary arrangement 14.

The forward low and reverse ratios are connected with the transmission input through the selective engagement of clutch 26. When the clutch 26 is engaged, the power input from shaft 10 passes through the torque converter 20 to the clutch 26 and then through the transfer gears 32 and 34 to the planetary arrangement 14. Depending upon the condition of arrangement 44, the planetary output shaft 48 is driven either forwardly or reversely. This rotation is delivered to the output gear 18 via the gear 50. During the low or reverse operation, the torque converter clutch 22 can be engaged thereby effectively bypassing a torque converter. As a general rule, however, the torque converter clutch 22 is not operated during the reverse and low ratios.

The clutch 28 has an output member 56 which is drivingly connected to a variable pulley 58 about which a drive belt 60 is entrained. The belt 60 is also entrained about a variable pulley 62. The pulley 62 has an output shaft 64 which is drivingly connected with variable drive output gear 68 which in turn, is drivingly connected through an idler 70 with the transmission output gear 18. As is well known, the variable ratio pulleys 58 and 62 can be controlled such that the speed of the shaft 64 relative to the shaft 24 can be controlled through a wide range of ratios. This is accomplished by reducing the distance between the sheaves of pulley 58 while increasing the distance between the sheaves of pulley 62.

To provide a high forward speed range, clutch 28 is engaged. This connects the input shaft 24 directly with the variable pulley 58. Also, during the high forward speed range, the torque converter clutch 22 is engaged thereby preventing the torque multiplier of the torque converter 20 from operating to increase the input torque to the shaft 24. The power from pulley 58 is delivered to pulley 62 via the belt 60 in a well known manner, such that the speed of shaft 64 and therefore transmission output gear 18 is controlled relative to the shaft 24 by the ratio within the variable belt drive mechanism 16.

When the clutch 28 is engaged, a ratio change occurs and the speed of shaft 24 is decreased. This ratio change is similar to a 1st to 2nd shift in a conventional automatic transmission. The one-way clutch 52 will overrun thereby preventing the speed increase from being transmitted to the carrier 40. This will permit a smooth ratio interchange between the low forward ratio and the high forward drive range. When the clutch 26 is disengaged, the planetary gear arrangement 14 is no longer driven by shaft 24, thereby preventing power loss.

In FIGS. 2A and 2B, it can be seen that the variable pulley 62 has a fixed sheave 72 and a variable sheave 74. The variable sheave 74 includes a conventional control mechanism which permits the axial displacement of the sheave 74 relative to the sheave 72. The variable pulley 58 has a fixed sheave 76 and a variable sheave 78 which can be controlled axially relative to the sheave 76. In the position shown, the pulleys 58 and 62 are positioned for the maximum torque transmissions. To reduce the torque ratio and therefore increase the speed ratio, the sheave 78 is moved rightward while the sheave 74 is moved rightward. When this occurs, the belt 60 will move radially outward along the sheaves 76 and 78 and radially inward along the sheaves 72 and 74, thereby increasing the speed ratio shafts 64 and 24.

In FIG. 2B, it can be seen that in the arrangement 44, the clutch 46 has a pair of inner teeth 80 and outer teeth 82. The brake 54 has a pair of inner teeth 84 and outer teeth 86. The one-way clutch 52 includes an outer race 88 drivingly connected with the carrier 40 and an inner race and integral shaft 90. The inner race and shaft 90 has formed thereon a set of teeth 92 which are adapted to engage with the teeth 80 when the LO position is selected. The ring gear 38 has a sleeve extension 94 on which is formed a plurality of teeth 96 which are adapted to engage the teeth 84 when the LO position is selected.

The carrier 40 has a hub portion 98 on which is formed a plurality of teeth 100. When the brake 54 is moved to the REV position, the teeth 86 engage with the teeth 100. Likewise, when the REV position is selected, the teeth 82 of clutch 46 will engage with the teeth 84 on the hub 98. This arrangement 44 provides a compact structure which is easily manipulated.

As seen in FIG. 2B, the brake 54 is moved axially by a control rod or shaft 102, while the clutch 46 has a yoke portion 104 which is operatively connected with a conventional shift fork, not shown. If desired, the control linkage for the shaft 102 and shift fork can be interconnected thereby controlling the synchronous movement of the clutch 46 and brake 54.

The FIGS. 2A and 2B also depict a plurality of bearing support arrangements which are conventional in nature and are not believed to require a verbal description since those skilled in the art will be quite familiar with the construction of these elements. Likewise, the clutches 26 and 28 are not shown in section since these devices are also conventional fluid operated mechanisms.

The following gear teeth members, gear ratios and belt ratios are for a typical transmission construction in accordance with this invention:

| | |
|---|---|
| Sun gear (36) teeth | 30 |
| Ring gear (38) teeth | 74 |
| Gears 32-34 ratio | 1.2:1 |
| Gears 50-18 ratio | 2.88:1 |
| Gears 68-18 ratio | 3.91:1 |
| Belt range of ratios | 1.806:1/.554:1 |
| Starting ratio | 12:1 |
| Engine speed (N)/Vehicle Speed (V) in LO | 186 |
| N/V range in High | 110/33.7 |

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A transmission comprising: input means for delivering power to the transmission; a planetary gear arrangement including a sun gear, a ring gear and a carrier assembly; first selectively engageable input clutch means for connecting said input means to said sun gear; output means for delivering power from the transmission; selectively engageable low clutch means for connecting said carrier assembly to said output shaft; selectively engageable low brake means for preventing rotation of said ring gear; reverse clutch means and reverse brake means for selectively connecting said ring gear to said output means and for selectively preventing rotation of said carrier assembly respectively for establishing a reverse ratio in said transmission; variable ratio pulley and belt means disposed for power transfer between said input means and said output means; and second selectively engageable input clutch means for connecting said input means to said variable ratio pulley and belt means for establishing a high forward variable ratio drive between said input means and said output means.

* * * * *